(12) United States Patent
Honda et al.

(10) Patent No.: US 6,763,129 B1
(45) Date of Patent: Jul. 13, 2004

(54) IMAGE PROCESSING APPARATUS

(75) Inventors: Michitaka Honda, Yaiti (JP); Hiroko Umazaki, Otawara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 637 days.

(21) Appl. No.: 09/679,440

(22) Filed: Oct. 4, 2000

(30) Foreign Application Priority Data

Oct. 5, 1999 (JP) .......................... 11-284415

(51) Int. Cl.[7] .............................. G06K 9/00; G06K 9/56; G06K 9/40
(52) U.S. Cl. .................. 382/132; 382/205; 382/269
(58) Field of Search ............................. 382/132, 205, 382/269

(56) References Cited

U.S. PATENT DOCUMENTS

| | | | | |
|---|---|---|---|---|
| 4,838,685 A | * | 6/1989 | Martinez et al. ............... | 382/85 |
| 5,050,227 A | * | 9/1991 | Furusawa et al. ............ | 382/269 |
| 5,319,206 A | | 6/1994 | Lee et al. | |
| 5,506,913 A | * | 4/1996 | Ibison et al. ................. | 382/132 |
| 5,561,724 A | * | 10/1996 | Kido et al. .................. | 382/264 |
| 5,602,934 A | | 2/1997 | Li et al. | |
| 5,602,942 A | * | 2/1997 | Takemoto et al. ........... | 382/263 |
| 5,717,791 A | | 2/1998 | Labaere et al. | |
| 5,799,100 A | | 8/1998 | Clarke et al. | |
| 5,809,105 A | | 9/1998 | Roehm et al. | |
| 5,974,163 A | * | 10/1999 | Kamei ......................... | 382/125 |
| 6,049,623 A | * | 4/2000 | Fuderer et al. .............. | 382/131 |
| 6,263,088 B1 | * | 7/2001 | Crabtree et al. ............. | 382/103 |
| 6,363,173 B1 | * | 3/2002 | Stentz et al. ................. | 382/195 |

FOREIGN PATENT DOCUMENTS

| | | |
|---|---|---|
| JP | 60-245084 | 12/1985 |
| JP | 3-198836 | 8/1991 |
| JP | 4-122355 | 4/1992 |
| JP | 6-47035 | 2/1994 |
| JP | 6-69447 | 9/1994 |
| JP | 7-79956 | 3/1995 |
| JP | 2508078 | 4/1996 |
| JP | 8-255238 | 10/1996 |
| JP | 11-4821 | 1/1999 |
| JP | 11-85961 | 3/1999 |

OTHER PUBLICATIONS

Denny L. Lee, et al., "A New Digital Detector for Projection Radiography", SPIE vol. 2432, 1995, pp. 237–249.

* cited by examiner

*Primary Examiner*—Leo Boudreau
*Assistant Examiner*—Hussein Akhavannik
(74) *Attorney, Agent, or Firm*—Oblon, Spivak, McClelland, Maier & Neustadt, P.C.

(57) ABSTRACT

An input image is inputted into a pre-process circuit and a spatial filter. The pre-process circuit emphasizes a linear shadow or an edge to some extent, or reduces noises overall. Following pre-processing, the image signal is supplied to a direction detection circuit, a direction and its intensity of an area of interest are detected. These two results of the detections are correlated with peripheral areas of interest to some extent by a vector filter. An output of the vector filter is supplied to a spatial filter coefficient generation circuit, and a filter coefficient of the spatial filter is decided. The spatial filter processes the input image based on the direction of the shadow and its intensity, whereby selectively suppressing noise components of the background in real time without damaging the contrasts of a linear shadow or an edge-like shadow.

51 Claims, 8 Drawing Sheets

LINEAR SHADOW    EDGE

| 0 | 0 | 0 | 0 | 0 |
|---|---|---|---|---|
| 0 | 0 | 0 | 0 | 0 |
| 2 | 2 | 2 | 2 | 2 |
| 0 | 0 | 0 | 0 | 0 |
| 0 | 0 | 0 | 0 | 0 |
FIG. 4A
| 0 | 0 | 0 | 0 | 0 |
|---|---|---|---|---|
| 0 | 0 | 1 | 0 | 0 |
| 1 | 2 | 2 | 2 | 1 |
| 0 | 0 | 1 | 0 | 0 |
| 0 | 0 | 0 | 0 | 0 |
FIG. 4B
| 0 | 0 | 0 | 0 | 0 |
|---|---|---|---|---|
| 0 | 0 | 0 | 1 | 2 |
| 0 | 1 | 2 | 1 | 0 |
| 2 | 1 | 0 | 0 | 0 |
| 0 | 0 | 0 | 0 | 0 |
FIG. 4C
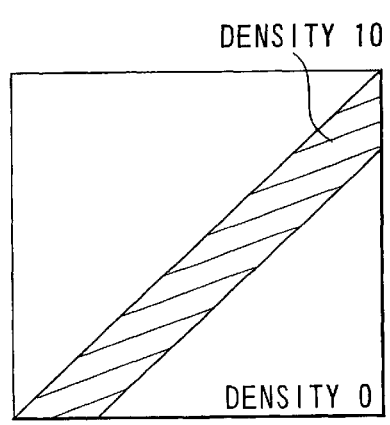
FIG. 5A
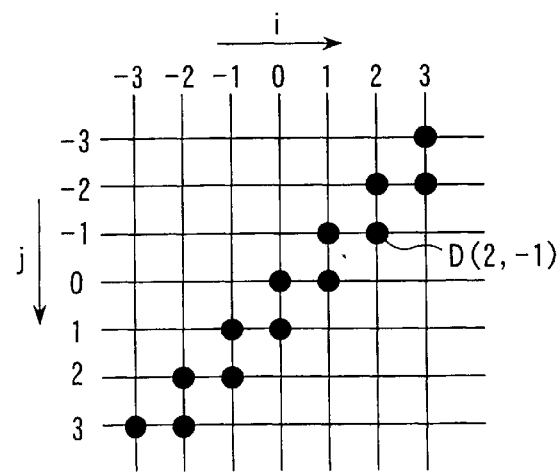
FIG. 5B

IMAGE PROCESSING APPARATUS

CROSS-REFERENCE TO RELATED APPLICATIONS

This application is based upon and claims the benefit of priority from the prior Japanese Patent Application No. 11-284415, filed Oct. 5, 1999, the entire contents of which are incorporated herein by reference.

BACKGROUND OF THE INVENTION

The present invention relates to an image processing apparatus and more particularly to an image processing apparatus which accurately separates a shadow and the background, and selectively suppresses a noise component of the background without damaging a contrast of the shadow in a medical image including a shadow potentially dispersed in the background noise, for example, in an X-ray image including a linear shadow such as a vascular shadow and a guide wire and an edge-like shadow.

Catheter therapy under fluoroscopy as a medical technology utilizing X-rays is frequently performed. However, as X-ray fluoroscopy reduces a dose of X-ray compared to that of conventional X-ray radiography so that it may reduce an amount of exposure of the patient, the problem that noises superimposed over an image are so large and a guide wire, a catheter or vascular shadow contrasted is hindered from seeing clearly by the background noise will occur. On the other hand, when performing fluoroscopy by increasing the dose, the background noise becomes relatively small, but it cannot be actually applied because the amount of exposure of the patient and medical concerns is increased. Thus, up to this time, the technologies for reducing noises and enhancing contrasts using image processing have been continued to be studied.

The most generally used image processing technology for reducing the noises is a method of averaging images which are inputted sequentially in time. This technology is already known, and regression filter, which referred to a recursive filter, as its applied technology is also generally used. Addition in time has a noise reducing action for an area without movement, however, with respect to an object moving just like a guide wire inserted into the heart vascular system, it has a drawback to reducing its contrast or resulting in afterglow. Therefore, the weight of averaging is changed per image so that image addition effect can be changed by detecting the movement of an object (See, for example, Japanese Patent Publication No. 2508078, Japanese Patent KOKOKU Publication No. 6-69447, Japanese Patent KOKAI Publication No. 3-198836, Japanese Patent KOKAI Publication No. 6-47035, Japanese Patent KOKAI Publication No. 7-79956, and Japanese Patent KOKAI Publication No. 8-255238).

However, since detection of the movement of an object is essentially performed by a method based on the difference between the present image and the prior image, time changing of pixel density due to the background noise as well as the movement of the object is falsely recognized.

Therefore, when precision for detecting a movement of these such as a catheter whose diameter is minimized as medical treatments progress recently, and a guide wire originally having a small contrast is enhanced, the effect of reducing noises results in its limit. This is because when processing parameter enlarging the effect of noise reduction is set, an image is not clearly seen by generating afterglow instead.

On the other hand, for the purpose of reducing noises and enhancing contrast, linear spatial filter is also used in general. This is a processing for obtaining weighted average of pixels distributed in space and emphasizing contrast by smoothing or by having spatial differential action. However, it has a drawback in damaging a contrast by blurring out a guide wire and a catheter to be linear shadows or edges of organs, and a drawback in noises also being emphasized when contrast is emphasized. Thus, an apparatus for spatially performing pattern recognition of vascular shadows (Japanese Patent KOKAI Publication No. 4-122355), or an apparatus for detecting an edge area of an object, and performing emphasizing contrast in an edge area and smoothing in other areas (Japanese Patent KOKAI Publication No. 60-245084) has been developed.

Since the former requires many averaging circuits and comparator circuits per one pixel unit and it requires a large number of circuits in order to perform a real-time calculation such as fluoroscopy processing and the like, it is not capable of producing the effect of reducing noises. Moreover, since the latter distinguishes an edge area from the background area with only information of one bit, if a false recognition is occurred, a noise which is located adjacently to an area being extremely performed smoothing and falsely recognized, for example, is emphasized and outputted, and it easily damages the quality of an image because the false recognition sensitively appear as an artifact of an output image.

Furthermore, besides those, in Japanese Patent KOKAI Publication No. 9-248920, an image processing method of identifying a linear shadow of an image by determining whether it is a true linear shadow or the background using information of 2 bits is disclosed, whereby resulting in identifying precision being enhanced, but some artifacts are occurred by a false recognition. Moreover, a problem that it cannot effectively perform noise reduction to the linear shadow itself is occurred.

As another method for image processing, a method for determining directivity of a linear shadow or edge, and emphasizing its directional component or separating an area having directional component from other area and separately filtering those areas has been reported. These technologies refers to Directional Adaptive Filters, and some of these technologies are known.

A description of a method for detecting a direction using wavelet transformation with respect to an X-ray image is disclosed in U.S. Pat. No. 5,799,100, or U.S. Pat. No. 5,717,791. Moreover, a method for applying a filter intensified for performing noise reduction at the place where a linear shadow or edge is absent, by analyzing the difference between the original MRI image and the MRI image subjected to 4-direction filtering is disclosed in U.S. Pat. No. 5,602,934. However, for these methods, its algorithms and calculations are too complex to perform real time processing. Specifically, in the case of a method using wavelet transformation, even when performing just only wavelet transformation, it is difficult to perform real time processing. Moreover, a method as described in the specification of U.S. Pat. No. 5,602,934, actually performing a filter having directivity of angles of 4 directions. In this case, however, besides disadvantage in precision when a linear shadow or an edge is present at the angles other than those angles, it has also a problem that the number of filter calculation times and amounts of calculations between images are large. Therefore, more high speed and precision enhancement are required.

Thus, in conventional image processing technologies, it was difficult to suppress not only selectively a noise component of the background, but also in real time without damaging contrast of a linear shadow and an edge-like shadow in a image including a linear shadow or an edge-like shadow. It should be noted that this problem can occur similarly, without limiting to an X-ray image, with respect to the images in general which a random noise is superimposed such as CT image, MRI image and the like.

BRIEF SUMMARY OF THE INVENTION

Accordingly, it is an object of the present invention to provide an image processing apparatus for enhancing the precision of separation between a linear shadow or an edge-like shadow and the background noise, suppress the background noise without damaging the contrasts of the shadows, and in addition to the above, being capable of performing a real time processing.

An image processing apparatus according to the present invention, comprises means for detecting a direction of a linear shadow or an edge-like shadow included in the image and its intensity, and filter means for performing a spatial filtering operation having directivity corresponding to the direction detected by the detecting means and its intensity.

Therefore, it can separate a linear shadow or an edge-like shadow potentially dispersed in the background of the image from the background noise and suppress the background noise without lowering the contrasts of the shadows.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 4A, 4B and 4C are diagrams showing examples of spatial filters of the first embodiment of the present invention;

FIGS. 5A and 5B are diagrams showing a principle for detecting a direction and its intensity of a linear shadow or an edge by applying principle component analyzing method to a direction detection circuit of the first embodiment of the present invention;

DETAILED DESCRIPTION OF THE INVENTION

A preferred embodiment of an image processing apparatus according to the present invention will now be described with reference to the accompanying drawings.

First Embodiment

An X-ray image as an example of an image subject to deal with is exemplified and described herein. In general, it is known that a noise included in a digital X-ray image is proportional to square root of the number (N) of X-ray incident photons injecting at one pixel. For example, when 100 number of photons are incident at one pixel, expected value L of outputted signal and standard deviation a are expressed as follows:

$$L = a \times 100 \times E$$

where E represents average energy of X-ray photon, "a" represents a gain obtained when X-ray energy is converted into an outputted signal.

$$\sigma = a \times 10 \times E$$

Therefore, an image obtained by irradiating X-ray to a uniformed subject is, on average, one on which noises having the standard deviation σ are distributed on the image having level of L. A fine and thin guide wire or catheter used in interventional radiology (IVR) is depicted as a linear shadow in the noise. It is an object of the present invention to lower noises with respect to such a linear shadow and an edge-like shadow embedded in the background noise without lowering a sharpness of the contrasts.

It should be noted that requirements are also present to clearly observe a linear shadow of vascular shadow and the like, and a tumor shadow or an edge of an organ and the like in other medical images as well as in an X-ray image. The present invention is applicable to such images, and furthermore, not limiting to medical images, but to images in general including a linear shadow and an edge.

Figure 1:
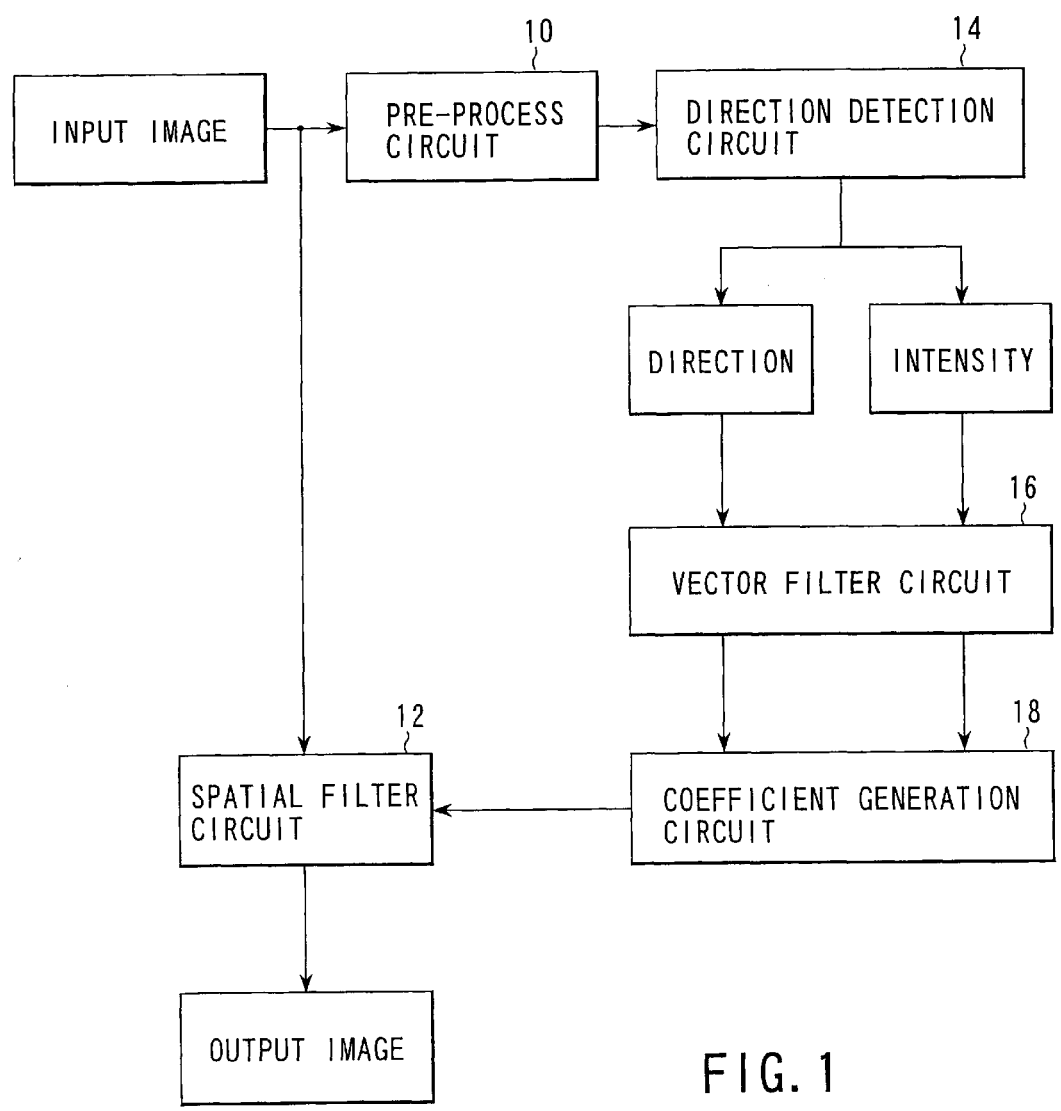
FIG. 1 is a block diagram showing the configuration of a first embodiment of an image processing apparatus according to the present invention.

FIG. 1 is a diagram showing schematic configuration of an image processing apparatus involving with a first embodiment of the present invention. The basic method of the present invention is to provide noise lowering filter along the direction of a linear shadow and an edge. An input image is inputted into a pre-process circuit 10 and a spatial filter circuit 12. The pre-process circuit 10 is used for either emphasizing a linear shadow or an edge of an image to some extent, or lowering noises in general and facilitating to detect a direction of the linear shadow or the edge and its intensity. Hence, the subjects to be observed in an X-ray image are medical tools such as catheter and a guide wire, or a contrast blood vessel, but usually these shadows have a pixel value smaller than that of the background. It is because these tools are constituted of an object having a high X-ray blocking ability, for example, a metal whose specific gravity is larger than that of water. In the latter processing, it is convenient that these shadows have a pixel value larger than that of the background to the contrary. Therefore, in the pre-process circuit 10, an operation may be also added so that the shadow has a pixel value larger than that of a background.

Figure 2:
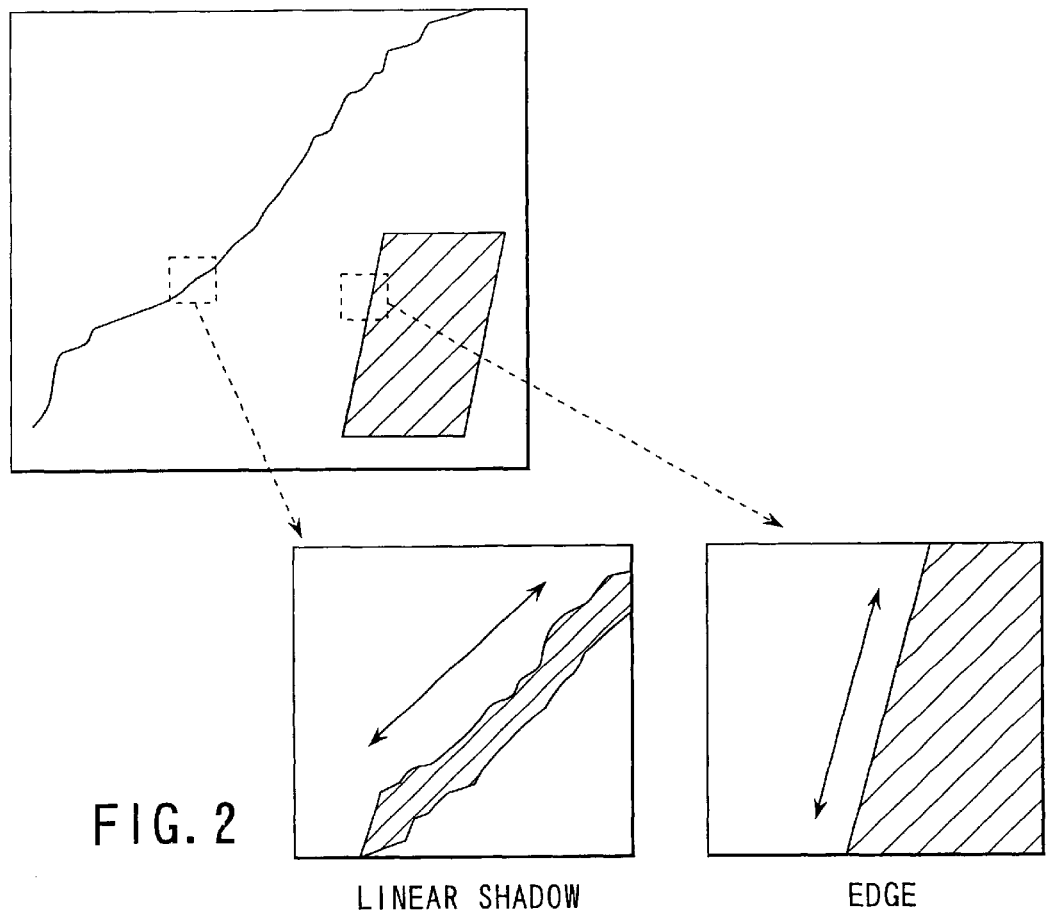
FIG. 2 is a diagram showing one example of an image subject of processing of the present invention.
Figure 3A:
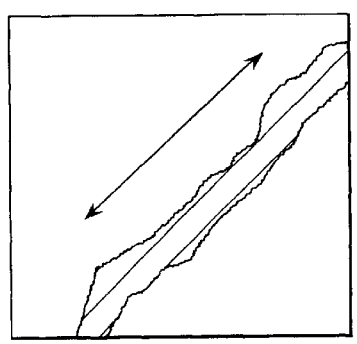
FIGS. 3A and 3B are diagrams showing examples of images whose directions are less intensified than that of FIG. 2 of the present invention.
Figure 3B:
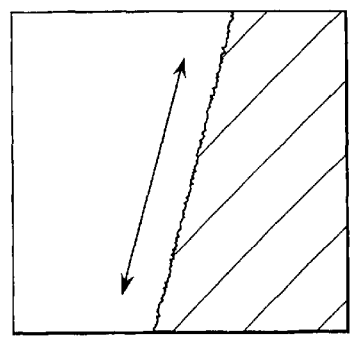
Figure 6:
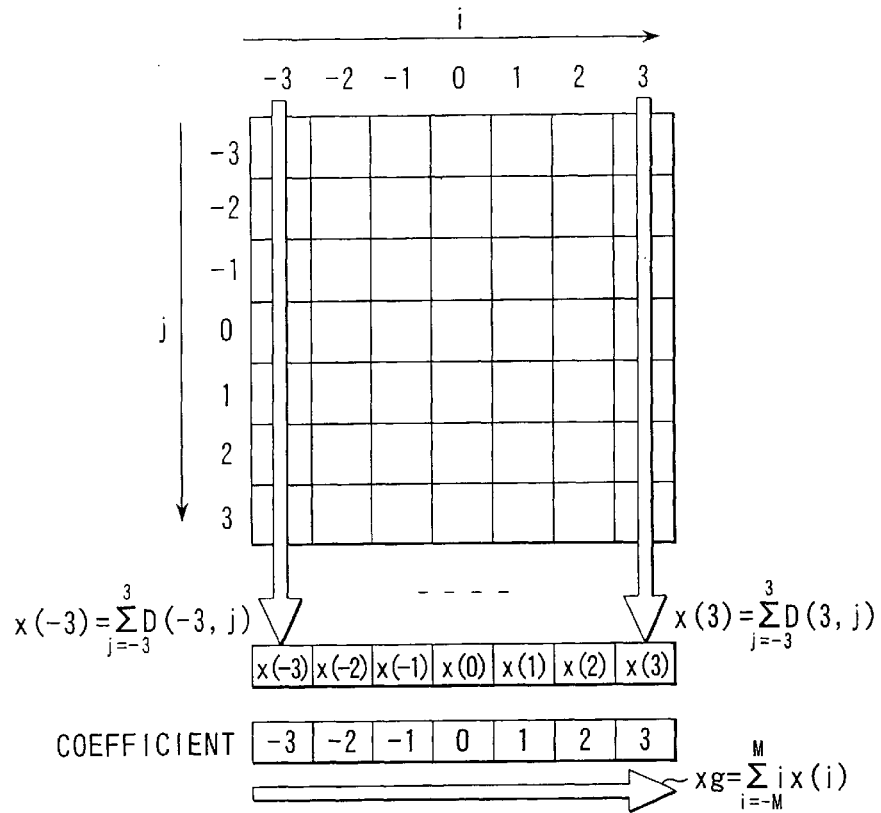
FIG. 6 is a circuit diagram of a part of a direction detection circuit executing product-sum calculation for analyzing a direction and its intensity.

Following pre-processing, the image signal is supplied to a direction detection circuit 14, and the direction detection circuit 14 detects a direction and its intensity of a linear shadow or an edge. This processing is performed at each area of interest in an image, and in a pattern having a linear shadow or an edge as shown in FIG. 2, a direction to which linear shadow or edge is running is detected. As a result of detection, a direction and its intensity are outputted. Since a direction to be detected is a direction of a certain pattern within an area of interest, even if a shadow running complicatedly depicts, once an area of interest is properly defined, the direction of the shadow can be assumed as a straight line within the area of interest, and it is easy to detect the direction. Moreover, an intensity of the direction is such an index that indicates more intensified when a shadow is clearer, and weaker when a shadow is more blurred. For example, the linear shadow and the edge illustrated in FIGS. 3A and 3B are ones whose intensity are less intensified compared to those of the linear shadow and the edge illustrated in FIG. 2.

Two outputs from the direction detection circuit 14 are modified and processed by a vector filter circuit 16. The object of this modification and processing is to make an error detection less influential by forcing the two outputs correlate to the resulting outputs from peripheral area of interest when a signal embedded in the noise is detected and determined as an erroneous direction and intensity. For example, even if a pattern just like a linear shadow is formed incidentally in a noise pattern and a direction is detected as intensified one, in the case where directions of peripheral area are varied with each other, the intensity of the detected direction is weakened by a certain degree. To the contrary, in the case where noise forces a part of an area of a linear shadow to accidentally lose a contrast as if the linear shadow is cut off, an erroneous direction is detected in the area, but when outputs of peripheral area are detected as a certain direction as a whole, direction is modified and corrected even in the area.

Two outputs from the vector filter circuit 16 (i.e., direction and intensity) are supplied to the spatial filter coefficient generation circuit 18, and a filter coefficient of the spatial filter circuit 12 is determined based on the direction and the intensity, whereby the image signal is processed by a certain spatial filter according to a direction and an intensity of a shadow within the area of interest based on an output from the vector filter circuit 16.

Examples of coefficient of the spatial filter circuit 12 are shown in FIGS. 4A, 4B and 4C. Spatial filters to be applied are a spatial filter shown in FIG. 4A in which a shadow having an intensified directivity in a horizontal direction is detected, a spatial filter shown in FIG. 4B in which a shadow having a weak directivity in a horizontal direction is detected, and a spatial filter shown in FIG. 4C in which a shadow having an intensified directivity in a direction which inclined approximately 30 degrees with regard to the horizontal direction, respectively. Although exemplified spatial filters described above are made as the sum of coefficients being 10, it is modulated that each coefficient is multiplied by $\frac{1}{10}$ and the sum of them is 1 so that the level of the image signal is not changed after filtering. These spatial filters have different frequency reduction effects along different directions. For example, in the case of FIG. 4A, an example has a frequency reduction effect toward horizontal direction, but a linear shadow running in the vertical direction is not made blurred since no operation involving with a filter is performed in the vertical direction.

Thus, the principle of the present invention is to perform noise reduction along the running direction of a linear shadow or an edge-like shadow according to the direction and its intensity of the shadow in each area of interest of an image.

Detailed operation of each portion in FIG. 1 will be described below.

The object of the pre-process circuit 10 is to reduce erroneous recognition of a shadow due to a noise in the latter processing steps by facilitating to detect a linear shadow or an edge-like shadow, or by reducing noise. For example, it is commonly known that a linear filter having all of coefficients of conventional 3×3 matrix used in general set at $\frac{1}{9}$ is a low-pass filter. If the lower frequency component of the image signal is extracted by the pre-process circuit 10, noise reduction is realized to some extent and erroneous recognition is reduced in the latter processing steps even on an image having a lot of noises. Moreover, in the case where an image of an edge being blurred is inputted, if the image is processed by a band pass filter having an edge emphasis action and the like, a linear shadow or an edge-like shadow can be depicted more clearly, the precision of the latter direction detection processing steps is enhanced. Moreover, on an X-ray image, it is frequently observed that a catheter or a guide wire is constituted of an object made of metal or some other materials having an X-ray blocking ability, a shadow is formed by a smaller pixel value. In the pre-process circuit 10, an image processing is performed such that this shadow has a larger pixel value than that of the background. This is because pixel value has to be larger in a shadow area so that calculating such a spatial expansion of a shadow is performed, and processing is performed as a largely expanding direction being a direction in the latter processing step of the direction detection circuit 14. It should be noted that if this processing is not performed, a direction having smaller spatial expansion should be made as the direction in the direction detection circuit 14. However, herein, description about the situation in which a shadow of this observation subject (a linear shadow, an edge) has a larger pixel value than that of the background is mentioned. The concretely simplest method is a processing of solely inverting code of a pixel value in the pre-process circuit 10 in the case where a shadow density of the observation subject is smaller than that of the background. It should be noted that the processing of performing reduction of a value of the relevant input image from the largest pixel value among the whole input image will also be good in a processing apparatus which does not perform signed calculation. For example, when an input image is expressed in 12 bits, the largest value of the input image is, $2^{12}-1=4$, 095. Thus, when 4,095−(pixel value of the input image) is calculated in the pre-process circuit 10, it results in a pixel value of the linear shadow included in the input image being larger than that of the background.

The most important portion of the present invention is the direction detection circuit 14 for detecting a direction of the shadow and its intensity. A method in accordance with the principle component analyzing method as one of this detecting means will be described below.

First, assume an area of interest of an image as shown in FIG. 5A. This is, for example, a part image of a guide wire depicted when it is inserted into a human body under X-ray fluoroscopy. Assume that a pixel density distribution within this area of interest is a distribution in which data is dispersed only in the number of pieces of pixel value D (i, j) in coordinate point (i, j) fixed as a center of (0, 0), the direction of a linear shadow is considered as a direction of a linear pattern in which spatial distribution of the data is mostly dispersed. An example shown in FIG. 5A is an example in which a linear pattern of pixel density 10 is running on pixel density 0, in this case, it is interpreted that coordinate positions of solid round marks, for example, D(2, −1)=10 pieces of data are present at the position of address (i, j)=(2, −1) on this image. When an image is interpreted as a distribution of the data of D (i, j) pieces at the address (i, j), the principle component analyzing method is applicable, and then in the case of expressing covariance matrix as follows, $S_{11}$, $S_{12}$, and $S_{22}$ become as follows:

$$A = \begin{bmatrix} S_{11} & S_{12} \\ S_{21} & S_{22} \end{bmatrix} \quad (1)$$

$$S_{11} = S'_{11} - Xg^2 z$$

$$S_{12} = S'_{12} - XgYgZ \quad (2)$$

$$S_{22} = S'_{22} - Yg^2 Z \quad (3)$$

$$S'_{11} = \sum_{i=-M}^{M} i^2 \sum_{j=-M}^{M} D(i,j) \quad (4)$$

$$S'_{12} = \sum_{i=-M}^{M} i \sum_{j=-M}^{M} j D(i,j) \quad (5)$$

$$S'_{22} = \sum_{j=-M}^{M} j^2 \sum_{i=-M}^{M} D(i,j) \quad (6)$$

where M represents a range of an area of interest. In an area exemplified in FIGS. 5A and 5B, M=3. Moreover, Xg, Yg, or Z indicates the sum of center of gravity of horizontal direction, the sum of center of gravity of vertical direction, and the sum of the number of pieces of data, respectively, and are expressed as following expressions. It should be noted that $S'_{11}$, $S'_{12}$, or $S'_{22}$ is a secondary moment surrounding the origin, respectively.

$$X_g = \sum_{i=-M}^{M} i \sum_{j=-M}^{M} D(i,j)/Z \quad (7)$$

$$Y_g = \sum_{j=-M}^{M} j \sum_{i=-M}^{M} D(i,j)/Z \quad (8)$$

-continued $$Z = \sum_{i=-M}^{M} \sum_{j=-M}^{M} D(i,j) \quad (9)$$

In this calculation, Z is the sum of pixel values within the area of interest, $Z/(2M+1)^2$ represents the average value of pixel values of the areas of interest. Therefore, if the average value of an input image is determined by other method, Z is not required to be determined. For example, in a modified example shown in FIG. 13 which will be described later, since the average value of the image is determined in the pre-process circuit 10, Z can be estimated from the result determined thereof.

Thus, the eigen value of covariance matrix A is determined as follows:

$$\lambda_1 = (1/2)\left[(S_{11} + S_{22}) + \sqrt{\{(S_{11} - S_{22})^2 + 4S_{12}^2\}}\right] \quad (10)$$

$$\lambda_2 = (1/2)\left[(S_{11} + S_{22}) - \sqrt{\{(S_{11} - S_{22})^2 + 4S_{12}^2\}}\right] \quad (11)$$

Assume that orientation of eigen vector to the eigen value is $\theta_1$, $\theta_2$, the followings can be obtained:

$$\tan(\theta_1) = (\lambda_1 - S_{11})/S_{12} \quad (12)$$

$$\tan(\theta_2) = (\lambda_2 - S_{11})/S_{12} \quad (13)$$

Specifically, since the orientation of eigen vector corresponding to the larger value out of eigen values $\lambda_1$ and $\lambda_2$ is the orientation of the principal axis which makes dispersion the maximum (a direction of larger spatial expansion), $\lambda_1$ is employed and $\theta_1$ can be determined from the equation (12). It should be noted that $\theta_1$ can be set in a range between 0 and 180 degrees, since $\theta_1$ is the orientation of the principal axis.

Moreover, the most general method among definition methods of direction and its intensity is expressed as:

$$C = \lambda_1/(\lambda_1 + \lambda_2) \quad (14)$$

by which a contribution rate is determined, and it can be determined between C=0 to 1. Specifically, $S_{11}$, $S_{22}$, and $S_{12}$ are calculated for pixel value D within an area of interest of an image (i, j) (i=−M, −(M−1), ..., M; j=−M, −(M−1), ..., M)), $\theta_1$ and C are determined, and then an index of a direction and its intensity of a running direction pattern can be determined, respectively.

Up to this point, the principle for determining an index of a direction of the shadow and its intensity has been described. Embodiments in which actual calculations are performed will be shown below. For example, in order to determine center of gravity Xg in the horizontal direction, first, the sum of the pixel values along the vertical direction is calculated per each column, and after values of (2M+1) pieces are determined, and then the values of (2M+1) pieces are accumulated along the horizontal direction. This calculation will be capable of being performed by the same calculation method as that of one-dimensional linear filter in general, and the filter coefficients are determined according to the distance from the origin. Specifically, center of gravity Xg in the horizontal direction is determined by performing the following operations for pixels within an area of interest:

(1) An output is fetched by applying the one-dimensional filter having all filter coefficients of 1 along the vertical direction.

(2) This operation is performed for all columns, and (2M+1) pieces of values arranged in the horizontal direction are determined.

(3) Assuming that filter coefficients are made as $-M$, $-(M-1)$, $-(M-2)$, ..., $(M-1)$, M for values of $(2M+1)$ pieces, one-dimensional filter is applied along the horizontal direction, and then this output is assumed as Xg.

In a similar manner, filter coefficients of the vertical and the horizontal direction are exchanged, center of gravity Yg of the vertical direction can be determined.

Assuming all filter coefficients are 1.0, the sum of data pieces Z can be determined by the same hardware.

Furthermore, for $S'_{11}$, $S'_{12}$, and $S'_{22}$, product-sum calculation will be applied when filter coefficients are changed, $S'_{11}$ can be determined as follows:

(1) An output is fetched by applying the one-dimensional filter having all filter coefficients of 1 along the vertical direction.

(2) This operation is performed for all columns, and $(2M+1)$ pieces of values arranged in the horizontal direction are determined.

(3) Assuming that filter coefficients are made as $M^2$, $(M-1)^2, (M-2)^2, \ldots, (M-1)^2, M^2$ for values of $(2M+1)$ pieces, one-dimensional filter is applied along the horizontal direction, and then this output is assumed as $S'_{11}$.

Furthermore, $S'_{22}$ can be determined when filter coefficients are changed between the horizontal direction and the vertical direction. Then, $S'_{12}$ can be determined as follows:

(1) An output is fetched by applying the one-dimensional filter having filter coefficients of $-M$, $-(M-1)$, $-(M-2)$, ..., $(M-1)$, M along the vertical direction.

(2) This operation is performed for all columns, and $(2M+1)$ pieces of values arranged in the horizontal direction are determined.

(3) Assuming that filter coefficients are made as $-M$, $-(M-1)$, $-(M-2)$, ..., $(M-1)$, M for values of $(2M+1)$ pieces, one-dimensional filter is applied along the horizontal direction, and then this output is assumed as $S'_{12}$.

Figure 7:
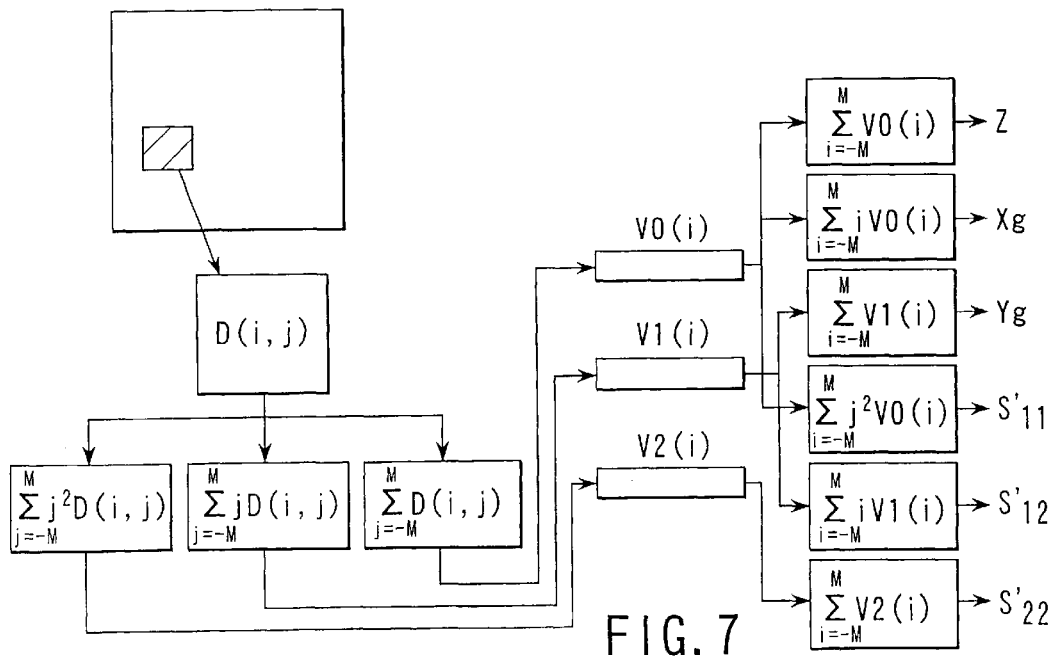
FIG. 7 is a concrete circuit diagram of a direction detection circuit of the first embodiment of the present invention.

Summarizing the above described calculations, calculations are carried out in the configuration as shown in FIG. 7. Three vectors $V_0(i)$, $V_1(i)$, $V_2(i)$ are determined by a product-sum calculation for the vertical direction, and then by a product-sum calculation of these for the horizontal direction, each value from the equation (4) to the equation (9) can be determined.

After these numerical values are determined, high speed calculation can be carried out using ROM or high speed CPU and the like because only numerical values are calculated.

Calculation of any size involving with an area of interest is possible, but a size of more than 7×7 is desirable. It is expected that an intensity of the direction is extremely low in an area not including a linear pattern or an area consisting of only noise. That dispersion of the horizontal and vertical directions is equal, i.e., $S_{11}=S_{22}$, or $S_{11}$ and $S_{22}$ are capable of being approximately equal with each other is a prerequisite to it. For realizing it, it is necessary to have enough statistics, generally speaking, more than 50 pieces are desirable, therefore, a size of more than 7×7 is desirable.

Now, for an image as a whole, while the center position of an area of interest is gradually changed, a direction and it intensity of local pattern is determined. For example, directions and their intensity are going to be determined while center position of an area of interest is shifted per 2 pixels to the horizontal direction on an image consisting of pixels of 500×500 matrix, information on directions and their intensity per an area divided in 250 pieces in the horizontal direction are obtained. In a similar manner, also in the vertical direction, scanning is performed while center position of an area of interest is shifted per 2 pixels whole over the image, information of 250×250 matrix is obtained. In the case where shift amount of this area of interest is small, since a certain area of interest and another area of interest which is shifted from the former have many superimposed pixel information between these areas, directions and their intensity which are determined are highly correlated each other. That is to say, in this case, redundancy is large. For example, when center position of an area is shifted per 1 pixel, information of 500×500 matrix is obtained, but since the results are mutually redundancy predominantly occupying ones in consideration of the large number of calculations for the whole image. Therefore, these calculations are wasted to some extent. To the contrary, when shift amount is so large, the number of calculations is small, but the independency of the local information is significant, and is easy to be influenced from the noise on the image. Maintaining the correlation with neighboring areas is also necessary to provide a vector filter on the next occasion, and it is desirable that shift amount is less than half of the size of an area of interest. For example, as a preferable example of the present invention, a method of scanning the whole image and locally determining directions and their intensity while an area of interest having a size of 7×7 is shifted per 2 pixels is recommended.

Figure 8:
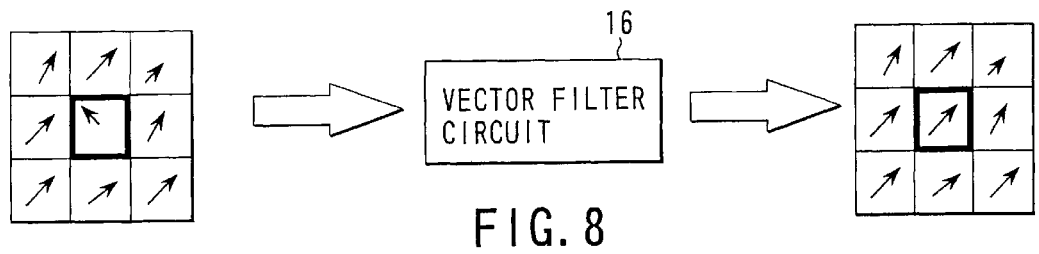
FIG. 8 is a schematic diagram showing an operation of a vector filter circuit of the first embodiment of the present invention.

After determining a direction $\theta_1$ and its intensity C by the direction detection circuit 14, a processing that determines more accurate directions and their intensity is performed on the basis of neighboring information by the vector filter circuit 16. An example shown in FIG. 8 is one of the vector filter circuits 16. When the directions of the areas of interest are determined per position area as shown in FIG. 8, even if the direction of the center pixel of 3×3 pixels is determined as a wrong direction due to the noise, a procedure in which the direction of the center of pixel is modified and corrected from information of a direction of neighboring pixels by supplying the image signal to the vector filter circuit 16.

Figure 9:
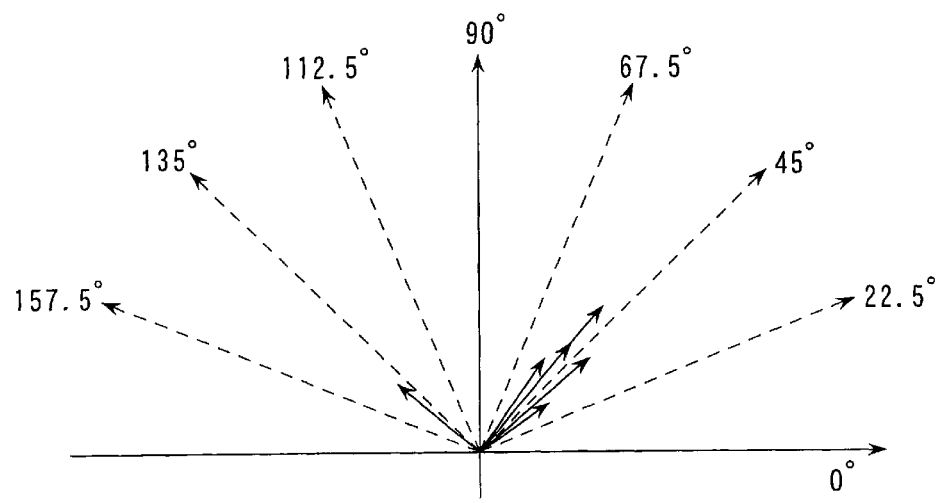
FIG. 9 is a detailed diagram showing an operation of a vector filter circuit of the first embodiment of the present invention.

This vector filter circuit 16 is constituted of the followings:

The first preferable example of configuration is a method of classifying angles of direction vector of neighboring small areas, and determining by majority. In FIG. 9, a conceptual diagram of classifying per 22. 5 degrees is shown. For example, in this case, since directions entering in a range of 45 degrees±11. 25 degrees is most common, it results in an output of the vector filter 16 being 45 degrees. On the other hand, intensity of direction can be decided by the sum of intensity of vectors selected by majority only divided by the sum of intensity of all-direction vectors. For example, assume that directions θs and their intensity Cs of a small subject area #0 and its 8 neighboring areas #1 to #8 are as the followings:

TABLE 1

|  | Small area position | Direction θ | Intensity C |
|---|---|---|---|
| #0 | Subject portion | 131 | 0.3 |
| #1 | Right of subject portion | 80 | 0.5 |
| #2 | Upper Right of subject portion | 44 | 0.1 |
| #3 | Upper of subject portion | 42 | 0.9 |
| #4 | Upper Left of Subject portion | 70 | 0.7 |
| #5 | Left of subject portion | 45 | 0.8 |

TABLE 1-continued

| Small area position | Direction θ | Intensity C |
|---|---|---|
| #6 Lower left of subject portion | 50 | 0.8 |
| #7 Lower of subject portion | 40 | 0.5 |
| #8 Lower right of subject portion | 49 | 0.6 |

Since areas having directions entering in a range of 45±11.25 degrees decided by majority are 6 areas of #2, #3, #5, #6, #7, and #8, intensity is decided according to these following calculations:

$$C = (0.1 + 0.9 + 0.8 + 0.8 + 0.5 + 0.6)/$$

$$(0.3 + 0.5 + 0.1 + 0.9 + 0.7 + 0.8 + 0.8 + 0.5 + 0.6)$$

$$= 3.7/5.2$$

$$= 0.7$$

The second preferred example of configuration of the vector filter 16 is a method of calculating matrix Ag which averages all of the neighboring small areas of $S_{11}$, $S_{22}$, $S_{12}$ and determining direction vector and its intensity on the basis of Ag matrix.

Matrix Ag is given as follows:

$$A = \begin{bmatrix} Sg_{11} & Sg_{12} \\ Sg_{21} & Sg_{22} \end{bmatrix}$$

$Sg_{11}$=Σ(the sum of $S_{11}$ of neighboring small areas)/(number of neighboring small areas) $Sg_{22}$=Σ(the sum of $S_{22}$ of neighboring small areas)/(number of neighboring small areas) $Sg_{12}$=Σ(the sum of $S_{12}$ of neighboring small areas)/(number of neighboring small areas)

When the sum of $S_{11}$ of the neighboring small area or the like is calculated, not a simple average value but a weighted average value may be used.

The object of vector filter 16 described above by two preferred examples of configuration is to estimate a pattern direction and its intensity in a wide range to a certain extent including the small subject area, whereby direction of the shadow can be modified and corrected by information obtained from peripheral areas even if a pattern direction is erroneously recognized as a specific direction due to noise and the like.

Figure 10:
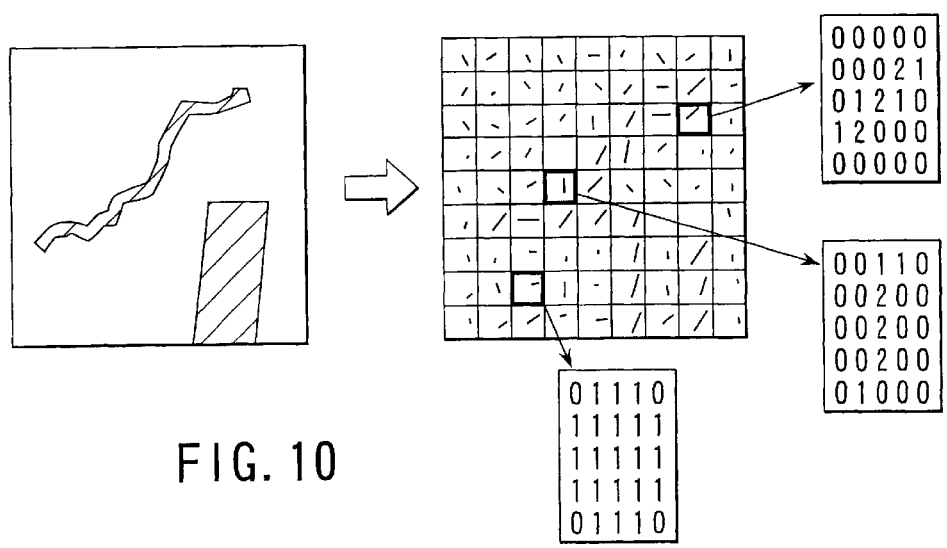
FIG. 10 is a diagram showing a spatial filter circuit of the first embodiment of the present invention.

After vector is modified and corrected on the basis of the results of direction detection in neighboring areas of the subject area by the vector filter circuit 16, a frequency reduction filter specific for this direction is applied. Examples of these filters are already shown in FIGS. 4A to 4C, but these filter coefficients are changed for every pixel by a spatial filter coefficient generation circuit 18 on the basis of information of directions and their intensity determined locally. In FIG. 10, an input image, an example of an output of the vector filter circuit 16, and a spatial filter of 5×5 to be provided on the basis of the information of the former ones are exemplified for 3 local areas. It is described that a linear shadow and an edge portion in an input image have intensified direction component locally, a spatial filter for reducing spatial frequency along that direction is applied to such portions and an all-directional spatial filter is applied in the background portion.

Figure 11A:
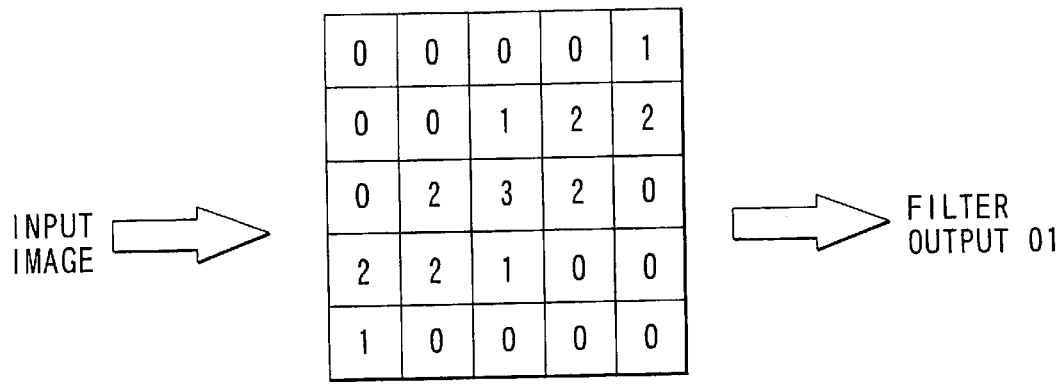
FIGS. 11A and 11B show an operation providing a plurality of small type spatial filters instead of providing one large type spatial filter in the first embodiment of the present invention.
Figure 11B:
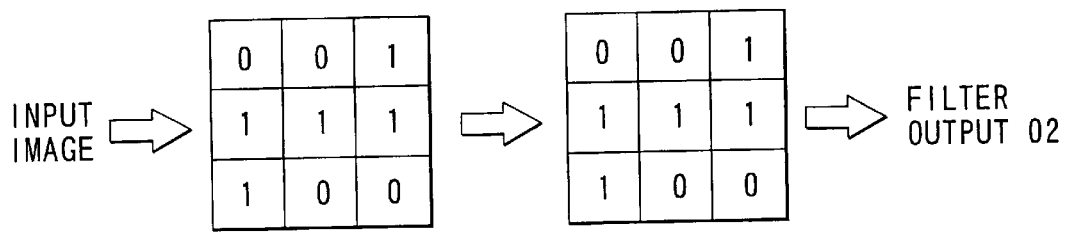

Thus, in the present embodiment, a spatial filter capable of setting a coefficient per pixel unit is applied so that it is difficult to carry out real time calculation when size of the spatial filter is large. Therefore, calculation circuit can be simplified by sequentially applying a spatial filter of smaller size instead of applying one larger filter. For example, product-sum calculations of 25 pieces is required for a spatial filter of 5×5, but if a spatial filter of 3×3 is provided 2 times in series, 18 pieces of product-sum calculations are enough to provide, and circuit scale can be minimized. In FIGS. 11A and 11B, an embodiment is shown. An output ζ1 of spatial filter of 5×5 applied once (FIG. 11A) and an output ζ2 of spatial filter of 3×3 (FIG. 11B) applied twice results in the identical output.

As described above, according to the present embodiment, the noise reduction can be achieved without blurring the linear shadow or the peripheral portions of an edge portion or lowering a contrast by providing a spatial filter according to a direction of pattern of a linear shadow or an edge portion included in an image and its intensity along its direction.

Other embodiments of an image processing apparatus according to the present invention will be described below. The portions identical with those of the first embodiment are attached with identical reference numerals, and its detailed description will be omitted.

Second Embodiment

Since the block diagram of the second embodiment of the present invention is identical with the block diagram of the first embodiment of the present invention, an illustration thereof will be omitted. The second embodiment of the present invention is an embodiment involving with a modification of processing of detecting a direction.

In the first embodiment of the present invention, $S_{11}$, $S_{12}$, and $S_{22}$ are determined by the equations (1) to (3). However, in general, a center of gravity is changed by average value of pixel values of an image. Therefore, when average level of an image is high, center of gravity is determined near the origin of an area of interest, and when average level of an image is low, center of gravity is located far from the origin. Moreover, in the case of an image in which the difference between two certain images are taken, for example, such as DSA (digital subtraction angiography) which is obtained in the X-ray diagnostic apparatus whose pixel average value is close to zero, it is recognized that the sum of data pieces may be zero, calculation using the equation (1) may occur the errors. Thus, a method of not depending on average value of pixel values as means for enhancing the durability of the present invention will be shown as the second embodiment of the present invention.

In the second embodiment of the present invention, $S_{11}$, $S_{12}$, and $S_{22}$ are determined by the following equations instead of the equations (1) to (3).

$$S_{11} = S'_{11} - Xg'^2(-2Z') \tag{19}$$

$$S_{12} = S'_{12} - XgYg'(-2Z') \tag{20}$$

$$S_{22} = S'_{22} - Yg'^2(-2Z') \tag{21}$$

$$X'_g = \sum_{i=-M}^{M} i \sum_{j=-M}^{M} D(i,j)/Z' \tag{22}$$

-continued $$Y'_g = \sum_{j=-M}^{M} j \sum_{i=-M}^{M} D(i,j)/Z' \tag{23}$$

$$Z' = \sum_{i=-M}^{M} \sum_{j=-M}^{M} |D(i,j) - D_{av}| \tag{24}$$

$$D_{av} = Z/(2M+1)^2 \tag{25}$$

The significance of this calculation is in defining center of gravity for component of difference from average value of pixel values within an area of interest as (X'g, Y'g).

Center of gravity is determined as a value not depending on average value by determining center of gravity with such a definition, because center of gravity position is determined through the procedure subjecting only the component of difference from average value even if average value $D_{av}$ takes any value.

In order to perform this calculation by actual hardware, the following calculation will be performed by the pre-process circuit 10.

Output of the pre-process circuit=(Input image)−(Low pass filter image of input image(=$D_{av}$))  (26)

According to this calculation, since an image inputted into the direction detection circuit 14 is an image in which average value is zero locally, calculation of the equation (24) can be performed as $D_{av}$=0, hardware configuration is simplified.

Third Embodiment

A third embodiment of the present invention is also an embodiment of involving with a modification of a processing of detecting a direction. In the present embodiment of the present invention, $S_{11}$, $S_{12}$, and $S_{22}$ are simply represented by simple secondary moment around the origin, they are determined as follows:

$$S_{11} = S'_{11} \tag{27}$$

$$S_{12} = S'_{12} \tag{28}$$

$$S_{22} = S'_{22} \tag{29}$$

When an eigen value of matrix A is determined using these equations, the farther a linear shadow is left from the center of an area of interest, the weaker intensity of directivity gradually is, and the still farther, another direction other than a direction of a linear shadow may be erroneously detected. However, because the directivity of an area of interest near the linear shadow is properly determined, it can be put to practical use. However, at the same time, calculation of Xg, Yg should be performed, and in the case where it is found too large shift of center of gravity is present, which means that the center position of the area of interest is far from the linear shadow, it is necessary to perform an operation such as one forcing the intensity of the directional be zero.

Fourth Embodiment

A fourth embodiment of the present invention is also an embodiment of involving with a modification of a processing of detecting a direction. Although a direction $\theta_1$ is mathematically determined without depending on average value of an image, contribution rate C which indicates an intensity has a mathematical nature that it gradually becomes smaller when the average value is larger. Moreover, if average value of an image is zero, it may result in $\lambda_1 + \lambda_2 = 0$, and may not determine correctly the directional.

For solving this problem, an amount P not depending on average value of an image is defined as P as follows:

$$P = \lambda_1 - \lambda_2 \tag{30}$$

where the measured P is compared with $\lambda_1 - \lambda_2$ previously measured under various conditions can be carried out, and an index C' which indicates intensity of a direction can be obtained.

In the case where only noise is distributed on an image without any linear shadow or edge-like pattern, P complies with probability distribution decided by a size of an area of interest and standard deviation a of noise of an image. This formulation is complex, but it mostly complies with normal distribution. On the other hand, the standard deviation $\sigma$ of noises can be determined from imaging conditions of an image and the like. As described already, in the case of an X-ray image, since the standard deviation a of noises of an image is in proportion to a root of X-ray photon number N, assume that average value of an image is L, the number of photon of X-ray can be estimated, and $\sigma$ value is also determined. For example, when $L_0$ of a pixel value is generated for an X-ray photon, the average value L of the image is obtained by:

$$N = L/L_0$$

Thus, $$\sigma = \sqrt{\{L_0(L/L_0)\}}$$

Figure 12:
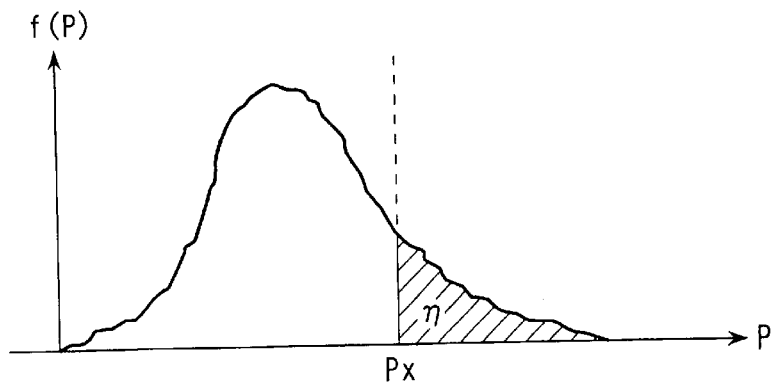
FIG. 12 is a diagram showing a principle of detecting a direction of a linear shadow or an edge of a second embodiment of an image processing apparatus of the present invention.

That is to say, by obtaining average value of the image, probability distribution of P can be calculated in the case where only noise is present. Assume that this distribution is f(P) (f(P) is a distribution in which it is to be 1.0 if integrated), probability can be calculated between 0 and 1 by determining where Px=$\lambda_1 - \lambda_2$ is located in this distribution, the Px=$\lambda_1 - \lambda_2$ being actually determined by direction detection processing within the area of interest. FIG. 12 represents an example of f(P) which was previously determined and Px which is actually obtained, if using integral value $\eta$ of oblique line portion in the figure, the following equation can be obtained:

$$C' = 1 - \eta$$

where C' represents intensity of a direction.

Figure 13:
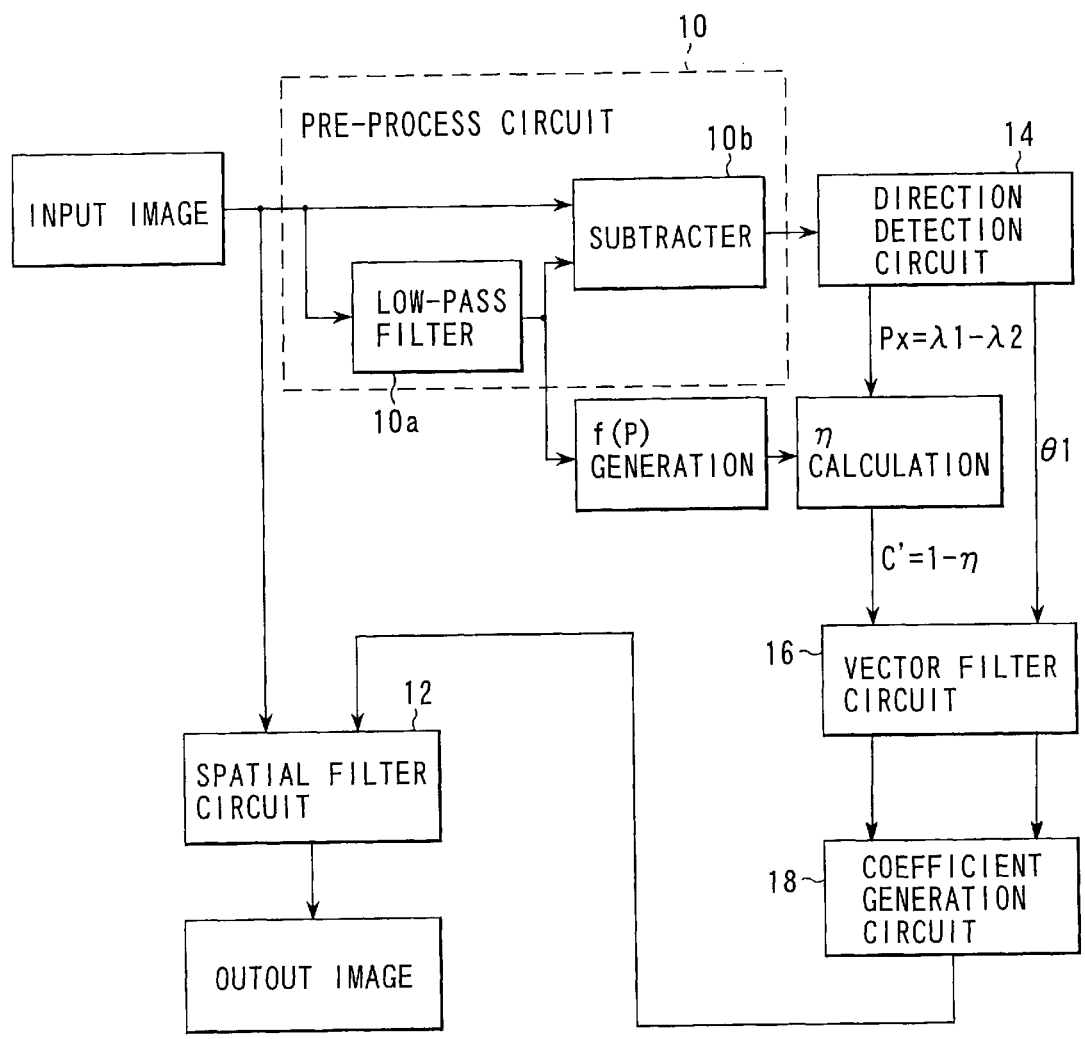
FIG. 13 is a block diagram showing the configuration of a fourth embodiment of an image processing apparatus according to the present invention.

In FIG. 13, a flow of signal of the fourth embodiment of the present invention is shown. In the pre-process circuit 10, a low-pass filter 10a suppresses the high frequency component noise. The subtracter circuit 10b outputs the high frequency component of the image signal. f(P) is generated based on the output signal from the low-pass filter 10a, i.e., a standard deviation a of noises corresponding to its average value. On the other hand, the direction detection circuit 14 determines $P_x = \lambda_1 - \lambda_2$. Moreover, $\eta$ is calculated from a position of $P_x$ of f(P) distribution, an then C' is determined.

Fifth Embodiment

Figure 14A:
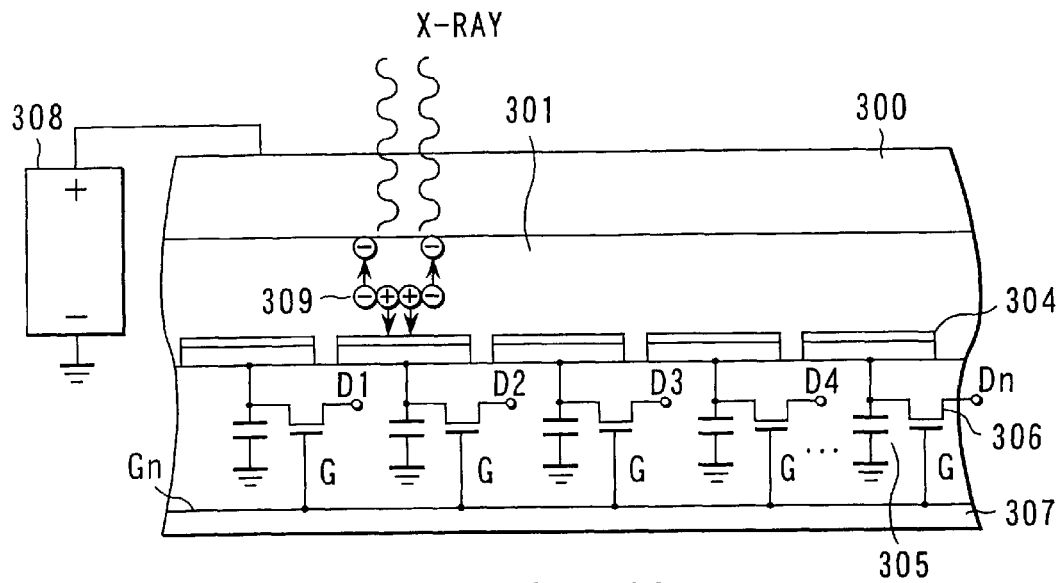
FIGS. 14A and 14B are diagrams showing the configuration of the flat type detector of direct conversion method employed in a fifth embodiment of an image processing apparatus according to the present invention.
Figure 14B:
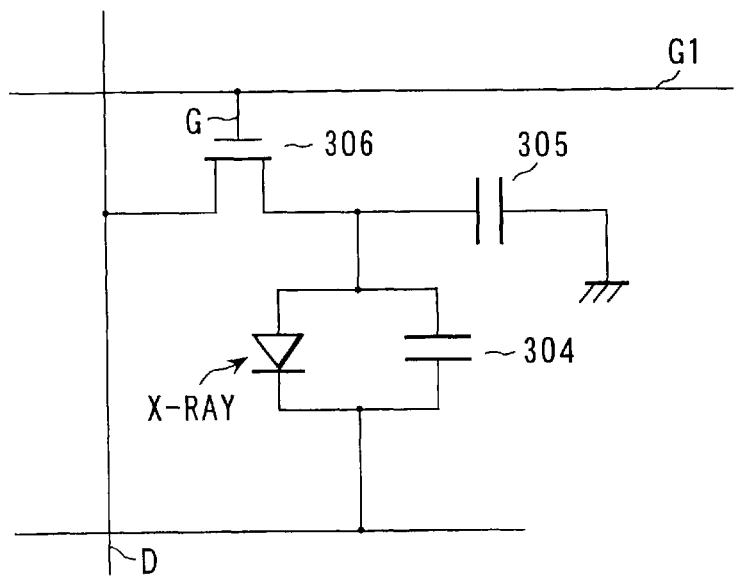

Next, as the fifth embodiment of the present invention, an X-ray diagnostic apparatus of a concrete application of an image processing apparatus of the present invention will be described. Conventionally, an X-ray diagnostic apparatus is a useful apparatus by which a subject is examined in a non-destructive manner, it is desirable for an X-ray diagnostic apparatus to obtain its high grade and fine moving image. Moreover, in order to avoid upsizing and expanding the depth of the apparatus, a flat type detection apparatus instead of an image intensifier tube is needed. For achieving these needs, a flat type detection apparatus of active matrix type is proposed. These flat type detection apparatus includes an indirect conversion method and a direct conversion method, the direct conversion method which directly detects electron-hole pair generated by an X-ray irradiation can obtain more high grade and fine image comparing to that of the indirect conversion method. This direct conversion method is mentioned, for example, in U.S. Pat. No. 5,319, 206; "A New Digital Detector for Projection Radiography", Denny L. Lee et al., SPIE. vol. 2432, pp 237–249, 1995; and Japanese Patent KOKAI Publication No. 11-4821. In FIGS. 14A and 14B, a section view and circuit a diagram of the detection apparatus described in Japanese Patent KOKAI Publication No. 11-4821 are shown.

Description is given with reference to FIGS. 14A and 14B. First, an X-ray which injects into a photo-conductor 301 generates an electron-hole pair 309, and electric charge is distributed by the signal capacity 305, and a capacity formed by a pixel electrode 304 and an opposing pixel electrode 300. An electric charge of the X-ray injection is collected through the drains D1 to Dn into the integrator by opening the gate G of transistor by a signal from a gate signal line G1. In a direct conversion method, a high grade and fine image can be realized by making a pixel electrode shape be finer and more precise as it is characterized in that all information injected into the photoconductor 301 is collected as the electron hole-pair 309. Herein, the reference numerical 308 indicates the power supply.

Now, although catheter therapy is frequently performed under fluoroscopy as a medical technology utilizing an X-ray, since an X-ray fluoroscopy reduces the dose in order to reduce exposure amount to a patient comparing with an X-ray radiography, it has a problem that noise is significantly superimposed on an image, linear shadows of a catheter, other guide wires and blood vessels and the like are hindered from the background noise and it is difficult to be seen clearly. In consideration with it being performed in an X-ray diagnostic system having flat type detection apparatus utilizing a direct conversion method described above, because a fine and high grade image can be formed according to its principle, this phenomenon is significantly occurred due to more frequent emergence of quantum noise of an X-ray at lower doses.

However, if an X-ray diagnostic system having a flat type detection apparatus of the direct conversion method is combined with an image processing apparatus according to the present invention, especially excellent results in which the background noises can be selectively suppressed without damaging the contrast of a linear shadow and edge-like shadow, while essentially making the best use of characteristics of the flat type detection apparatus excellent in an ability with respect to high resolution and high grade and fine imaging function are provided for the flat type detection apparatus of the direct conversion method. Specifically, an X-ray image obtained by detecting an X-ray transmitted through the subject body with a flat type detection apparatus of the direct conversion method as shown in FIGS. 14A and 14B is inputted into an image processing apparatus according to the present invention as an input image of FIG. 1, a spatial filter processing having a directivity according to a direction of a linear shadow and edge-like shadow and its intensity is provided, and then an X-ray diagnostic apparatus in which a high grade and fine image can be obtained is realized. Therefore, during catheter therapy using lower doses, background noises can be selectively suppressed without damaging the contrast of a linear shadow. An X-ray diagnostic apparatus of the fifth embodiment is applicable to any embodiment from the first to fourth embodiments described above.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above mentioned description, an X-ray image is exemplified, but not limited thereto, the present invention is similarly applicable to an image in general in which random noises are superimposed, such as a CT image, an MRI image and the like. Each embodiment is solely described, but multiple embodiments are combined at their convenience.

According to the present invention, as described above, the following effects are obtained:

(1) An image processing apparatus according to the present invention comprises means for detecting a direction and an intensity of a linear or an edge-like shadow included in an image; and means for processing the image using a spatial filter having a directivity according to the direction and intensity detected by said detecting means.

According to this image processing apparatus, the precision of separation between a linear shadow or an edge and the background noise is enhanced, and background noises can be suppressed without lowering the contrast.

(2) An image processing apparatus according to the present invention is an image processing apparatus described in (1), and in which a pixel value of the shadow is larger than a pixel value of a background of the image; said detecting means detects a direction based on an orientation of eigen vector corresponding to a larger eigen value out of two eigen values of covariance matrix of an area of interest of the image; and said processing means processes the image using a digital spatial filter whose frequency characteristic of the direction detected by said detecting means is different from a frequency characteristic of other directions.

(3) An image processing apparatus according to the present invention is an image processing apparatus described in (1), and in which a pixel value of the shadow is smaller than a pixel value of a background of the image; said detecting means detects a direction based on an orientation of eigen vector corresponding to a smaller eigen value out of two eigen values of covariance matrix of an area of interest of the image; and said processing means processes the image using a digital spatial filter whose frequency characteristic of the direction detected by said detecting means is different from a frequency characteristic of other directions.

According to the image processing apparatus described in (2) and (3), a direction and its intensity can be detected in real time and high speed processing can be carried out as well as the precision of separation between a linear shadow or edge and the background noise is enhanced, and background noises can be suppressed without lowering the contrast.

(4) An image processing apparatus according to the present invention is an image processing apparatus described in one of (1), (2) and (3), and in which said detecting means sequentially detects a direction and an intensity of the shadow per an area of interest of the image while shifting the area of interest to a horizontal direction and a vertical direction; and said processing means processes the image using a spatial filter with a size of the area of interest while shifting the filter over the image and changing the directivity.

(5) An image processing apparatus according to the present invention is an image processing apparatus described in (2) or (3), and in which said area of interest comprises at least 5×5 pixel arrays; and said detecting means performs a two-dimensional product-sum calculation between predetermined coefficients and pixel values in the area of interest and calculates a covariance matrix of the area of interest based on the result of the two-dimensional product-sum calculation.

An image processing apparatus described in (2), (3), (4) or (5) can reduce the number of product-sum calculations for detecting directions and their intensity, hence the scale of the hardware may be smaller and high speed processing can be carried out.

(6) An image processing apparatus according to the present invention is an image processing apparatus described in (1), and in which said detecting means estimates dispersion of random noises within an area of interest based on an average value of pixel distribution within the area of interest, estimates probability distribution which is determined by the estimated dispersion of random noises and a matrix size of the area of interest with respect to an index representing intensity, and calculates a probability that intensity calculated based on pixel values within the area of interest can be taken under the estimated probability distribution, the calculated probability being the index representing intensity.

(7) An image processing apparatus according to the present invention is an image processing apparatus described in (2) or (3), and in which said detecting means detects a ratio of two eigen values of a covariance matrix as an index of intensity of a direction.

(8) An image processing apparatus according to the present invention is an image processing apparatus described in (1), and in which said detecting means calculates a new covariance matrix by performing a weighted average to elements of an old covariance matrix of an area of interest set up and elements of a covariance matrix of a peripheral area of the area of interest and determines a pattern direction vector based on a direction and an eigen value of an eigen vector of the new of covariance matrix as indices of a pattern running direction and an intensity of the pattern direction of the area of interest; and said processing means processes the image using a spatial filter having a directivity according to the pattern direction vector determined by said detecting means.

Since an image processing apparatus described in (6), (7) or (8) can determine center of gravity position without depending on average value of a pixel value of an area of interest, the precision of detection of directions and their intensity is enhanced.

(9) An image processing apparatus according to the present invention is an image processing apparatus described in (8), and in which said detecting means calculates new covariance matrixes of peripheral areas of the area of interest, calculates directions of eigen vectors of the peripheral areas, and determines a direction of eigen vector which is appeared in the largest number of areas as a pattern direction of the area of interest.

(10) An image processing apparatus according to the present invention is an image processing apparatus described in one of (1) to (3), and in which said detecting means processes the image using a frequency reduction filter, and performs direction detection processing to a difference image between an output image from the frequency reduction filter and an input image to the frequency reduction filter.

(11) An image processing apparatus according to the present invention is an image processing apparatus described in one of (1) to (3), and in which said detecting means performs direction detection processing after inverting a code of a pixel value of the image.

(12) An image processing apparatus according to the present invention is an image processing apparatus described in one of (1) to (3), and in which said detecting means performs direction detection processing after subtracting the image from the maximum value decided by the maximum bit number of the image.

(13) An image processing apparatus according to the present invention is an image processing apparatus described in one of (1) to (3), and in which said detecting means performs pre-processing for suppressing noise spectrum while emphasizing a band having signal spectrum of the image.

(14) An image processing apparatus according to the present invention is an image processing apparatus described in (6), and in which the index representing intensity is an eigen value obtained based on a covariance matrix around a position decided by a center position of an area of interest and a center of gravity of pixel distribution within the area of interest.

(15) An image processing apparatus according to the present invention is an image processing apparatus described in (6), and in which the index representing intensity is a difference or a ratio of eigen values obtained based on covariance matrixes around positions decided by a center position of an area of interest and a center of gravity of pixel distribution within the area of interest.

According to an image processing apparatus described in (12), (13), (14) or (15), the precision of detection of directions and their intensity is enhanced.

(16) An X-ray diagnostic image processing apparatus according to the present invention comprises means for obtaining an X-ray image of a subject using an X-ray detection apparatus of direct conversion method; and an image processing apparatus comprising means for detecting a direction and an intensity of a linear or an edge-like shadow included in the X-ray image, and means for processing the X-ray image using a spatial filter having a directivity according to the direction and intensity detected by said detecting means.

(17) An X-ray diagnostic apparatus according to the present invention is an X-ray diagnostic apparatus described in (16), and in which an image processing apparatus utilizing an image processing apparatus described in any one of (2) to (15) may be employed.

According to an X-ray diagnostic apparatus described in (16) or (17), an small sized and light-weighted X-ray diagnostic apparatus by which a high resolution and highly graded fine dynamic image is obtained can be realized, background noises can be selectively suppressed without damaging the contrast of a linear shadow even during a catheter therapy.

What is claimed is:

1. An image processing apparatus comprising:
   means for detecting a direction and an intensity of a linear or an edge-like shadow included in an image; and
   means for processing the image using a spatial filter having a directivity according to the direction and the intensity detected by said detecting means, wherein said detecting means estimates dispersion of random noises within an area of interest based on an average value of pixel distribution within the area of interest, estimates probability distribution which is determined by the estimated dispersion of random noises and a matrix size of the area of interest with respect to an index representing intensity, and calculates a probability that intensity calculated based on pixel values within the area of interest can be taken under the estimated probability distribution, the calculated probability being the index representing intensity.

2. The image processing apparatus according to claim 1, wherein
   a pixel value of the shadow is larger than a pixel value of a background of the image;
   said detecting means detects a direction based on an orientation of eigen vector corresponding to a larger eigen value out of two eigen values of covariance matrix of an area of interest of the image; and
   said processing means processes the image using a digital spatial filter whose frequency characteristic of the direction detected by said detecting means is different from a frequency characteristic of other directions.

3. The image processing apparatus according to claim 2, wherein
   said detecting means sequentially detects a direction and an intensity of the shadow per an area of interest of the image while shifting the area of interest to a horizontal direction and a vertical direction; and
   said processing means processes the image using a spatial filter with a size of the area of interest while shifting the filter over the image and changing the directivity.

4. The image processing apparatus according to claim 2, wherein
   said area of interest comprises at least 5×5 pixel arrays; and
   said detecting means performs a two-dimensional product-sum calculation between predetermined coefficients and pixel values in the area of interest and calculates a covariance matrix of the area of interest based on the result of the two-dimensional product-sum calculation.

5. The image processing apparatus according to claim 2, wherein said detecting means detects a ratio of two eigen values of a covariance matrix as an index of intensity of a direction.

6. The image processing apparatus according to claim 2, wherein said detecting means processes the image using a frequency reduction filter, and performs direction detection processing to a difference image between an output image from the frequency reduction filter and an input image to the frequency reduction filter.

7. The image processing apparatus according to claim 2, wherein
   said detecting means performs direction detection processing after inverting a code of a pixel value of the image.

8. The image processing apparatus according to claim 2, wherein said detecting means performs direction detection processing after subtracting the image from the maximum value decided by the maximum bit number of the image.

9. The image processing apparatus according to claim 2, wherein said detecting means performs pre-processing for suppressing noise spectrum while emphasizing a band having signal spectrum of the image.

10. The image processing apparatus according to claim 1, wherein
    a pixel value of the shadow is smaller than a pixel value of a background of the image;
    said detecting means detects a direction based on an orientation of eigen vector corresponding to a smaller eigen value out of two eigen values of covariance matrix of an area of interest of the image; and
    said processing means processes the image using a digital spatial filter whose frequency characteristic of the direction detected by said detecting means is different from a frequency characteristic of other directions.

11. The image processing apparatus according to claim 10, wherein
    said detecting means sequentially detects a direction and an intensity of the shadow per an area of interest of the image while shifting the area of interest to a horizontal direction and a vertical direction; and
    said processing means processes the image using a spatial filter with a size of the area of interest while shifting the filter over the image and changing the directivity.

12. The image processing apparatus according to claim 10, wherein
    said area of interest comprises at least 5×5 pixel arrays; and
    said detecting means performs a two-dimensional product-sum calculation between predetermined coefficients and pixel values in the area of interest and calculates a covariance matrix of the area of interest based on the result of the two-dimensional product-sum calculation.

13. The image processing apparatus according to claim 10, wherein said detecting means detects a ratio of two eigen values of a covariance matrix as an index of intensity of a direction.

14. The image processing apparatus according to claim 10, wherein said detecting means processes the image using a frequency reduction filter, and performs direction detection processing to a difference image between an output image from the frequency reduction filter and an input image to the frequency reduction filter.

15. The image processing apparatus according to claim 10, wherein said detecting means performs direction detection processing after inverting a code of a pixel value of the image.

16. The image processing apparatus according to claim 10, wherein said detecting means performs direction detection processing after subtracting the image from the maximum value decided by the maximum bit number of the image.

17. The image processing apparatus according to claim 10, wherein said detecting means performs pre-processing for suppressing noise spectrum while emphasizing a band having signal spectrum of the image.

18. The image processing apparatus according to claim 1, wherein
    said detecting means sequentially detects a direction and an intensity of the shadow per an area of interest of the image while shifting the area of interest to a horizontal direction and a vertical direction; and said processing means processes the image using a spatial filter with a size of the area of interest while shifting the filter over the image and changing the directivity.

19. The image processing apparatus according to claim 1, wherein said detecting means calculates a new covariance matrix by performing a weighted average to elements of an old covariance matrix of an area of interest set up and elements of a covariance matrix of a peripheral area of the area of interest and determines a pattern direction vector based on a direction and an eigen value of an eigen vector of the new of covariance matrix as indices of a pattern running direction and an intensity of the pattern direction of the area of interest; and said processing means processes the image using a spatial filter having a directivity according to the pattern direction vector determined by said detecting means.

20. The image processing apparatus according to claim 19, wherein said detecting means calculates new covariance matrixes of peripheral areas of the area of interest, calculates directions of eigen vectors of the peripheral areas, and determines a direction of eigen vector which is appeared in the largest number of areas as a pattern direction of the area of interest.

21. The image processing apparatus according to claim 1, wherein said detecting means processes the image using a frequency reduction filter, and performs direction detection processing to a difference image between an output image from the frequency reduction filter and an input image to the frequency reduction filter.

22. The image processing apparatus according to claim 1, wherein said detecting means performs direction detection processing after inverting a code of a pixel value of the image.

23. The image processing apparatus according to claim 1, wherein said detecting means performs direction detection processing after subtracting the image from the maximum value decided by the maximum bit number of the image.

24. The image processing apparatus according to claim 1, wherein said detecting means performs pre-processing for suppressing noise spectrum while emphasizing a band having signal spectrum of the image.

25. The image processing apparatus according to claim 1, wherein the index representing intensity is an eigen value obtained based on a covariance matrix around a position decided by a center position of an area of interest and a center of gravity of pixel distribution within the area of interest.

26. The image processing apparatus according to claim 1, wherein the index representing intensity is a difference or a ratio of eigen values obtained based on covariance matrixes around positions decided by a center position of an area of interest and a center of gravity of pixel distribution within the area of interest.

27. An image processing apparatus comprising:

means for detecting a direction and an intensity of a linear or an edge-like shadow included in an image; and means for processing the image using a spatial filter having a directivity according to the direction and the intensity detected by said detecting means, wherein said detecting means calculates a new covariance matrix by performing a weighted average to elements of an old covariance matrix of an area of interest set up and elements of a covariance matrix of a peripheral area of the area of interest and determines a pattern direction vector based on a direction and an eigen value of an eigen vector of the new of covariance matrix as indices of a pattern running direction and an intensity of the pattern direction of the area of interest; and said processing means processes the image using a spatial filter having a directivity according to the pattern direction vector determined by said detecting means.

28. The image processing apparatus according to claim 27, wherein a pixel value of the shadow is larger than a pixel value of a background of the image;

said detecting means detects a direction based on an orientation of eigen vector corresponding to a larger eigen value out of two eigen values of covariance matrix of an area of interest of the image; and said processing means processes the image using a digital spatial filter whose frequency characteristic of the direction detected by said detecting means is different from a frequency characteristic of other directions.

29. The image processing apparatus according to claim 28, wherein said detecting means sequentially detects a direction and an intensity of the shadow per an area of interest of the image while shifting the area of interest to a horizontal direction and a vertical direction; and said processing means processes the image using a spatial filter with a size of the area of interest while shifting the filter over the image and changing the directivity.

30. The image processing apparatus according to claim 28, wherein said area of interest comprises at least 5×5 pixel arrays; and said detecting means performs a two-dimensional product-sum calculation between predetermined coefficients and pixel values in the area of interest and calculates a covariance matrix of the area of interest based on the result of the two-dimensional product-sum calculation.

31. The image processing apparatus according to claim 28, wherein said detecting means detects a ratio of two eigen values of a covariance matrix as an index of intensity of a direction.

32. The image processing apparatus according to claim 28, wherein said detecting means processes the image using a frequency reduction filter, and performs direction detection processing to a difference image between an output image from the frequency reduction filter and an input image to the frequency reduction filter.

33. The image processing apparatus according to claim 28, wherein said detecting means performs direction detection processing after inverting a code of a pixel value of the image.

34. The image processing apparatus according to claim 28, wherein said detecting means performs direction detection processing after subtracting the image from the maximum value decided by the maximum bit number of the image.

35. The image processing apparatus according to claim 28, wherein said detecting means performs pre-processing for suppressing noise spectrum while emphasizing a band having signal spectrum of the image.

36. The image processing apparatus according to claim 27, wherein a pixel value of the shadow is smaller than a pixel value of a background of the image;

said detecting means detects a direction based on an orientation of eigen vector corresponding to a smaller eigen value out of two eigen values of covariance matrix of an area of interest of the image; and said processing means processes the image using a digital spatial filter whose frequency characteristic of the direction detected by said detecting means is different from a frequency characteristic of other directions.

37. The image processing apparatus according to claim 36, wherein said detecting means sequentially detects a direction and an intensity of the shadow per an area of interest of the image while shifting the area of interest to a horizontal direction and a vertical direction; and said processing means processes the image using a spatial filter with a size of the area of interest while shifting the filter over the image and changing the directivity.

38. The image processing apparatus according to claim 36, wherein said area of interest comprises at least 5×5 pixel arrays; and said detecting means performs a two-dimensional product-sum calculation between predetermined coefficients and pixel values in the area of interest and calculates a covariance matrix of the area of interest based on the result of the two-dimensional product-sum calculation.

39. The image processing apparatus according to claim 36, wherein said detecting means detects a ratio of two eigen values of a covariance matrix as an index of intensity of a direction.

40. The image processing apparatus according to claim 36, wherein said detecting means processes the image using a frequency reduction filter, and performs direction detection processing to a difference image between an output image from the frequency reduction filter and an input image to the frequency reduction filter.

41. The image processing apparatus according to claim 36, wherein said detecting means performs direction detection processing after inverting a code of a pixel value of the image.

42. The image processing apparatus according to claim 36, wherein said detecting means performs direction detection processing after subtracting the image from the maximum value decided by the maximum bit number of the image.

43. The image processing apparatus according to claim 36, wherein said detecting means performs pre-processing for suppressing noise spectrum while emphasizing a band having signal spectrum of the image.

44. The image processing apparatus according to claim 27, wherein said detecting means sequentially detects a direction and an intensity of the shadow per an area of interest of the image while shifting the area of interest to a horizontal direction and a vertical direction; and said processing means processes the image using a spatial filter with a size of the area of interest while shifting the filter over the image and changing the directivity.

45. The image processing apparatus according to claim 27, wherein said detecting means calculates new covariance matrixes of peripheral areas of the area of interest, calculates directions of eigen vectors of the peripheral areas, and determines a direction of eigen vector which is appeared in the largest number of areas as a pattern direction of the area of interest.

46. The image processing apparatus according to claim 27, wherein said detecting means processes the image using a frequency reduction filter, and performs direction detection processing to a difference image between an output image from the frequency reduction filter and an input image to the frequency reduction filter.

47. The image processing apparatus according to claim 27, wherein said detecting means performs direction detection processing after inverting a code of a pixel value of the image.

48. The image processing apparatus according to claim 27, wherein said detecting means performs direction detection processing after subtracting the image from the maximum value decided by the maximum bit number of the image.

49. The image processing apparatus according to claim 27, wherein said detecting means performs pre-processing for suppressing noise spectrum while emphasizing a band having signal spectrum of the image.

50. The image processing apparatus according to claim 27, wherein said detecting means estimates dispersion of random noises within an area of interest based on an average value of pixel distribution within the area of interest, estimates probability distribution which is determined by the estimated dispersion of random noises and a matrix size of the area of interest with respect to an index representing intensity, and calculates a probability that intensity calculated based on pixel values within the area of interest can be taken under the estimated probability distribution, the calculated probability being the index representing intensity, and the index representing intensity is an eigen value obtained based on a covariance matrix around a position decided by a center position of an area of interest and a center of gravity of pixel distribution within the area of interest.

51. The image processing apparatus according to claim 27, wherein said detecting means estimates dispersion of random noises within an area of interest based on an average value of pixel distribution within the area of interest, estimates probability distribution which is determined by the estimated dispersion of random noises and a matrix size of the area of interest with respect to an index representing intensity, and calculates a probability that intensity calculated based on pixel values within the area of interest can be taken under the estimated probability distribution, the calculated probability being the index representing intensity, and the index representing intensity is a difference or a ration of eigen values obtained based on covariance matrixes around positions decided by a center position of an area of interest and a center of gravity of pixel distribution within the area of interest.

* * * * *

UNITED STATES PATENT AND TRADEMARK OFFICE
CERTIFICATE OF CORRECTION

PATENT NO. : 6,763,129 B1
DATED : July 13, 2004
INVENTOR(S) : Honda et al.

It is certified that error appears in the above-identified patent and that said Letters Patent is hereby corrected as shown below:

Title page,
Item [75], Inventors, should read:

-- (75) Inventors: Michitaka Honda, Yaita (JP);
Hiroko Umazaki, Otawara (JP) --

Signed and Sealed this

Thirty-first Day of August, 2004

JON W. DUDAS
*Director of the United States Patent and Trademark Office*